United States Patent [19]
Curtis

[11] Patent Number: 5,440,609
[45] Date of Patent: Aug. 8, 1995

[54] TELEPHONE TESTER JUNCTION BOX

[76] Inventor: Tony G. Curtis, 2931 S. Clearfork Rd., Sevierville, Tenn. 37862

[21] Appl. No.: 238,626

[22] Filed: May 5, 1994

[51] Int. Cl.$^6$ .......................... H04M 3/08; H04M 3/22
[52] U.S. Cl. .......................................... 379/21; 379/26; 379/27; 379/29; 379/30; 379/31
[58] Field of Search ........................ 379/21, 26, 27, 29, 379/30, 31, 438

[56] References Cited

U.S. PATENT DOCUMENTS

| | | | |
|---|---|---|---|
| 4,214,132 | 7/1980 | Kelso | 379/21 |
| 4,626,633 | 12/1986 | Ruehl | 379/27 |
| 4,647,725 | 3/1987 | Dellinger | 379/438 |
| 4,756,017 | 7/1988 | Bush | 379/26 |
| 4,969,179 | 11/1990 | Kanare | 379/21 |
| 4,991,196 | 2/1991 | Krebs | 379/21 |
| 5,092,785 | 3/1992 | Chen | 379/29 |
| 5,157,708 | 10/1992 | Garthwaite | 379/21 |
| 5,218,616 | 6/1993 | Stephens | 379/29 |
| 5,307,398 | 4/1994 | Contonzo | 379/29 |

Primary Examiner—Stephen Chin
Assistant Examiner—Vijay Shankar

[57] ABSTRACT

A junction box for coupling alligator test clips to a modular telephone line. The device includes a housing having a plurality of contacts to which each alligator clip of a telephone testing apparatus may be connected. A female modular telephone receptacle is provided having a plurality of color-coded wires electrically coupled to the respective contacts. The contacts are each labeled in accordance with conventional telephone wire colors. The telephone testing apparatus may be easily coupled to a male modular telephone connector of the telephone line to be tested. The device eliminates the conventional practices of moving furniture to access telephone outlets, and disassembling telephones for access to internal contacts.

1 Claim, 4 Drawing Sheets

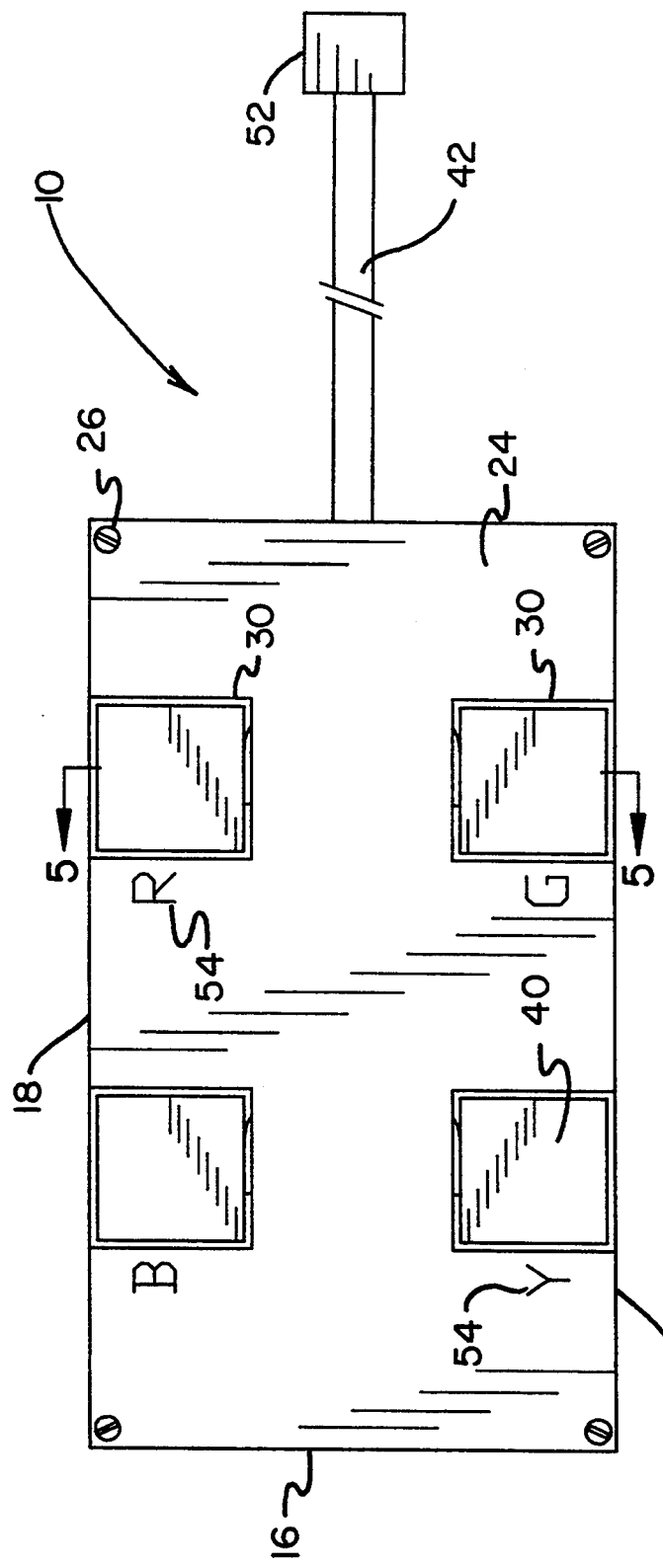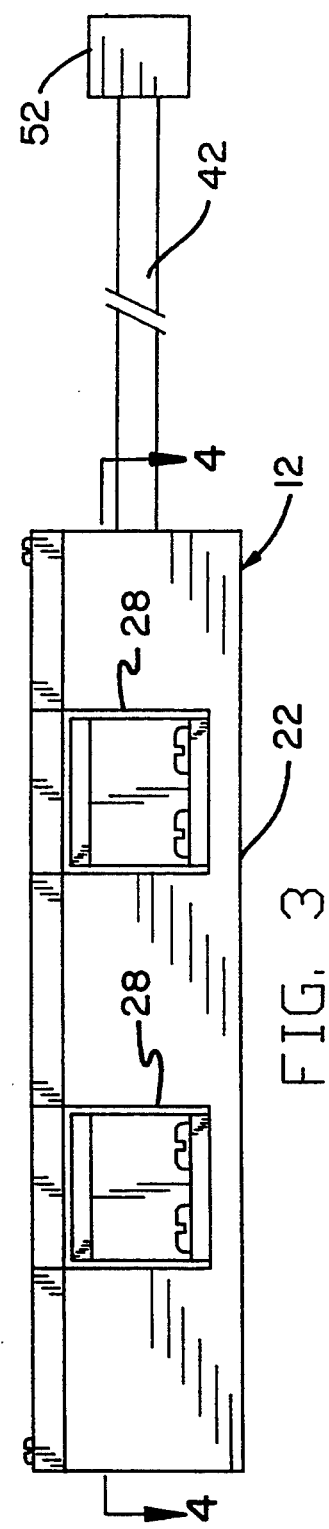

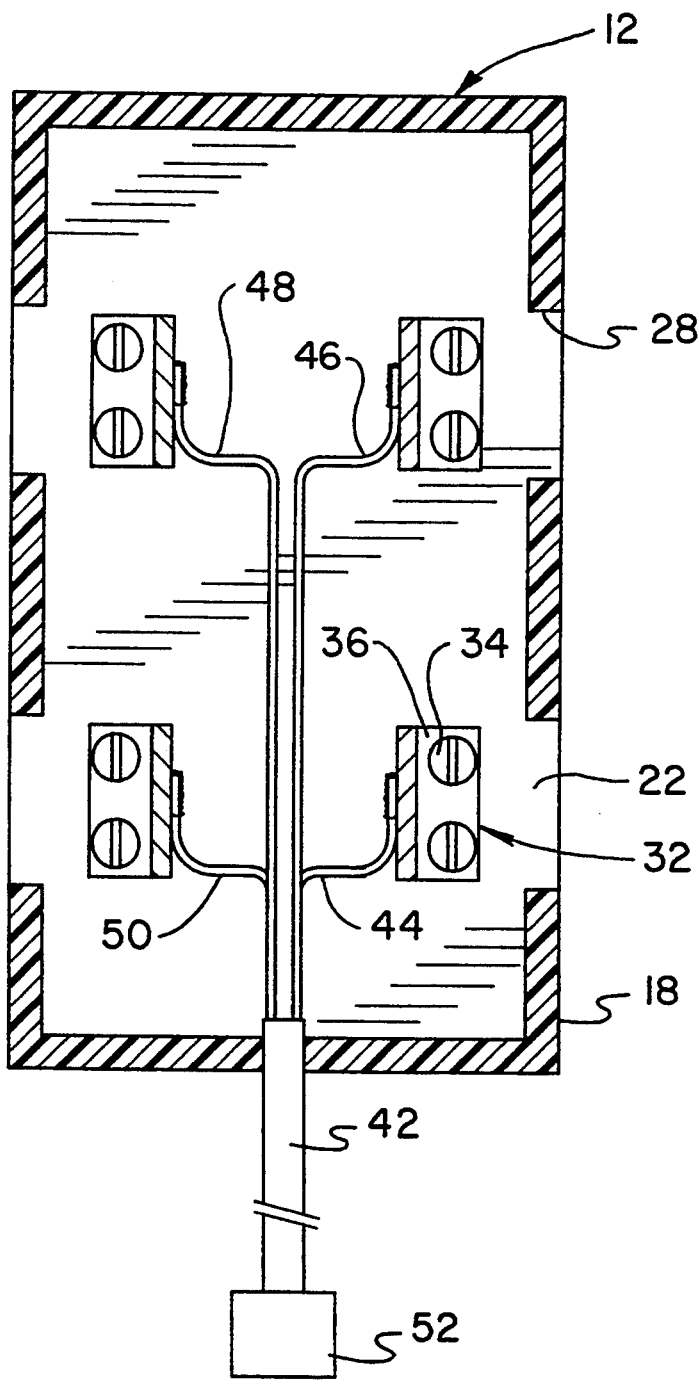
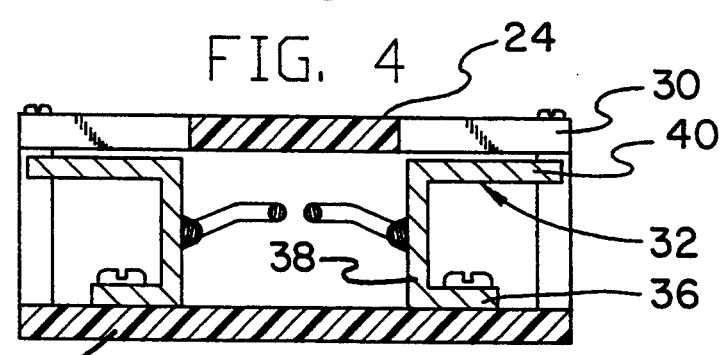

TELEPHONE TESTER JUNCTION BOX

BACKGROUND OF THE INVENTION

1. Field of the Invention

The present invention relates to electrical testers and more particularly pertains to a telephone tester junction box for coupling alligator test clips to a modular telephone line.

2. Description of the Prior Art

The use of electrical testers is known in the prior art. More specifically, electrical testers heretofore devised and utilized for the purpose of testing telephone lines are known to consist basically of familiar, expected and obvious structural configurations, notwithstanding the myriad of designs encompassed by the crowded prior art which have been developed for the fulfillment of countless objectives and requirements.

More specifically, telephone testing apparatuses are typically provided with a plurality of alligator clips which must be electrically coupled to the telephone line to be tested, thereby resulting in the need to directly access the telephone line outlet by moving furniture or other objects, or alternatively, disassembling a telephone to access the contact located therein such that the alligator clips may be attached thereto.

For example, a compact telephone line test apparatus is illustrated in U.S. Pat. No. 4,920,555 which may be utilized for determining the operational status of a telephone line. The device includes a male modular connector which must be coupled directly to a telephone outlet, thereby resulting in the inherent necessity of moving furniture and other objects which may possibly be obstructing such outlet.

Other known prior art electrical testers include U.S. Pat. No. 4,843,620; U.S. Pat. No. 4,756,017; U.S. Pat. No. 5,073,919; and U.S. Pat. No. 5,063,585.

Thus, while it can be seen that electrical testers for telephone lines are well known in the art, a means for effectively and efficiently coupling such testers to a telephone line without the typical attendant difficulties of moving furniture and/or disassembling a telephone to access the contacts present therein it is not provided in the prior art.

Therefore, it can be appreciated that there exists a continuing need for a new telephone tester junction box for coupling alligator test clips to a modular telephone line. In this regard, the present invention substantially fulfills this need.

SUMMARY OF THE INVENTION

In view of the foregoing disadvantages inherent in the known types of electrical testers now present in the prior art, the present invention provides a new telephone tester junction box construction wherein the same can be utilized for electrically coupling alligator test clips of a telephone testing apparatus to a modular telephone line. As such, the general purpose of the present invention, which will be described subsequently in greater detail, is to provide a new telephone tester junction box apparatus and method which has many of the advantages of the electrical testers mentioned heretofore and many novel features that result in a telephone tester junction box which is not anticipated, rendered obvious, suggested, or even implied by any of the prior art electrical testers, either alone or in any combination thereof.

To attain this, the present invention generally comprises a junction box for coupling alligator test clips to a modular telephone line. The device includes a housing having a plurality of contacts to which each alligator clip of a telephone testing apparatus may be connected. A female modular telephone receptacle is provided having a plurality of color-coded wires electrically coupled to the respective contacts. The contacts are each labeled in accordance with conventional telephone wire colors, whereby the telephone testing apparatus may be easily coupled to a male modular telephone connector of the telephone line to be tested. The device eliminates the conventional practices of moving furniture to access telephone outlets, and disassembling telephones for access to internal contacts thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone tester junction box apparatus and method which has many of the advantages of the electrical testers mentioned heretofore and many novel features that result in a telephone tester junction box which is not anticipated, rendered obvious, suggested, or even implied by any of the prior art electrical testers, either alone or in any combination thereof.

It is another object of the present invention to provide a new telephone tester junction box which may be easily and efficiently manufactured and marketed.

It is a further object of the present invention to provide a new telephone tester junction box which is of a durable and reliable construction.

An even further object of the present invention is to provide a new telephone tester junction box which is susceptible of a low cost of manufacture with regard to both materials and labor, and which accordingly is then susceptible of low prices of sale to the consuming public, thereby making such telephone tester junction boxes economically available to the buying public.

Still yet another object of the present invention is to provide a new telephone tester junction box which provides in the apparatuses and methods of the prior art some of the advantages thereof, while simultaneously overcoming some of the disadvantages normally associated therewith.

Still another object of the present invention is to provide a new telephone tester junction box for coupling alligator test clips of a telephone testing apparatus to a modular telephone line.

Yet another object of the present invention is to provide a new telephone tester junction box which includes a housing having a plurality of contacts to which individual alligator clips of a telephone testing apparatus may be connected, with a female modular telephone receptacle electrically coupled to each of the respective contacts, the contacts each being labelled in accordance with conventional telephone wire colors, whereby the telephone testing apparatus may be easily coupled to a male modular telephone connector.

Even still another object of the present invention is to provide a new telephone tester junction box which substantially eliminates the conventional practices of moving furniture to access telephone outlets, and disassembling telephones for access to internal contacts thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the present invention.

FIG. 3 is a side elevation view of the invention.

FIG. 4 is a cross sectional view taken along line 4—4 of FIG. 3.

FIG. 5 is a cross sectional view taken along line 5—5 of FIG. 2.

DESCRIPTION OF THE PREFERRED EMBODIMENT

Figure 1:
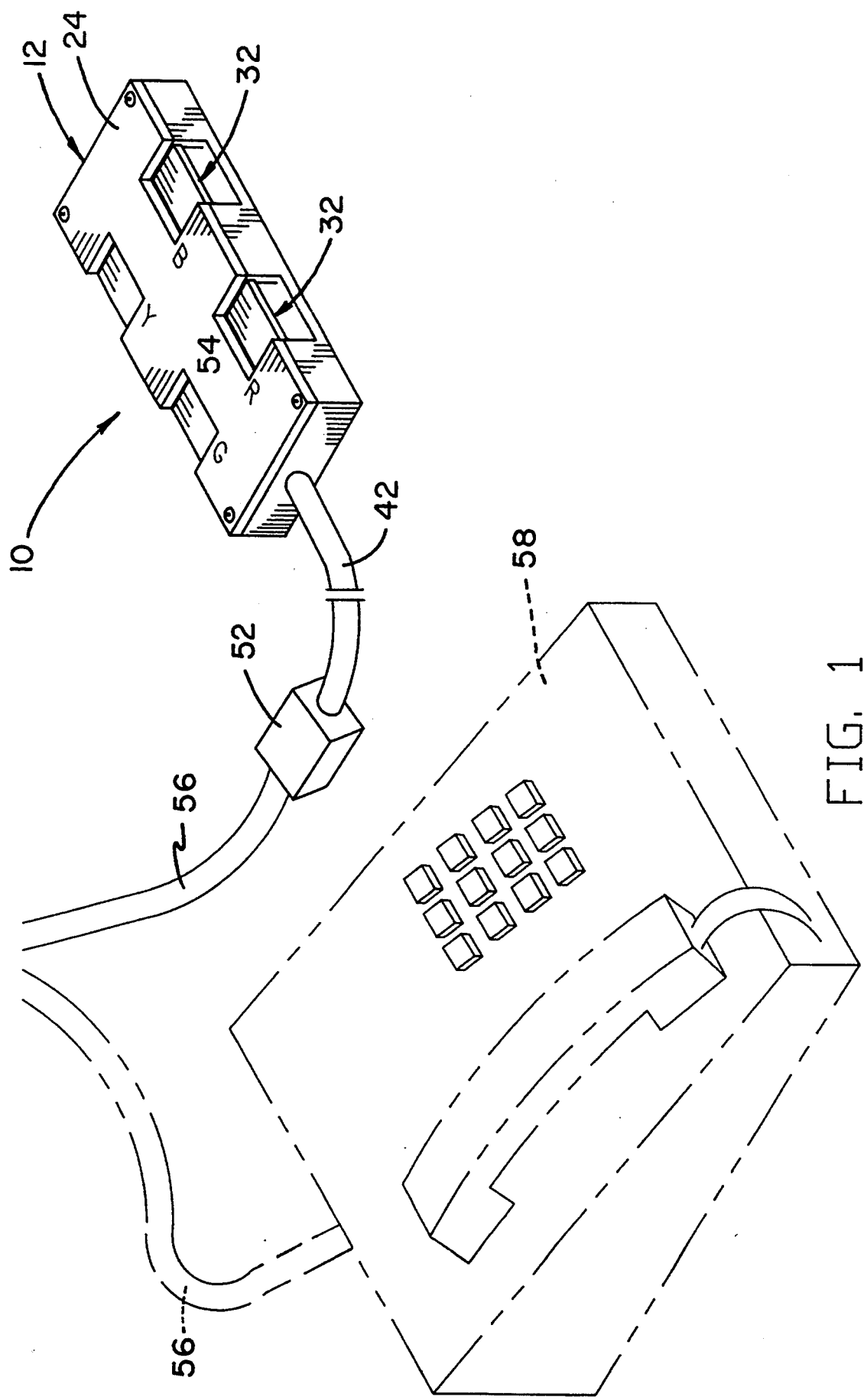
FIG. 1 is an isometric illustration of a telephone tester junction box comprising the present invention.

With reference now to the drawings, and in particular to FIGS. 1-7 thereof, a new telephone tester junction box embodying the principles and concepts of the present invention and generally designated by the reference numeral 10 will be described.

More specifically, it will be noted that the telephone tester junction box 10 comprises a substantially rectangular housing 12 having a front wall 14 spaced from a rear wall 16 with a pair of spaced side walls 18, 20 extending parallel between the front and rear wall. The housing 12 further includes a base 22 integrally formed with the walls 14-20. To complete the housing 12, a cover plate 24 is removably coupled to an upper surface of the walls 14-20 by a plurality of cover fasteners 26, as best illustrated in FIGS. 2 and 3.

Each of the side walls 18, 20 is provided with a pair of substantially rectangularly shaped, spaced side wall apertures 28 which extend from the upper surface of the side walls to the base 22, as shown in FIG. 3, for example. The cover plate 24 is provided with a plurality of similarly shaped cover plate apertures 30 which are orthogonally aligned with each of the side wall apertures 28 (see FIG. 2).

Turning now to FIGS. 4 and 5, it can be shown that a plurality of contacts 32 are secured to the base 22 by a plurality of threaded contact fasteners 34. As most clearly shown in FIG. 5, each of the contacts 32 comprises a contact base plate 36 through which the contact fasteners 34 project to engage the base 22. From there, a contact vertical plate 38 integrally and orthogonally extends from the contact base plate 36 and continues into an orthogonally projecting contact horizontal plate 40 positioned slightly below the respective cover plate aperture 30. The contact horizontal plate 40 does not extend exteriorly of the housing 12, but remains slightly below the cover plate 24 and slightly within the confines of the respective side walls 18, 20.

An extension line 42 having a red lead 44, a blue lead 46, a yellow lead 48, and a green lead 50 extends through an aperture in the front wall 14, as best shown in FIG. 4. Further, a conventionally known modular female jack 52 is coupled to the extension line 42 in accordance with the color coded polarity convention used within standard telephone connections. As such, the red lead 44 of the extension line 42 is electrically connected to a first one of the contacts 32, the blue lead 46 is electrically coupled to a second one of the contacts, the yellow lead 48 is electrically connected to a third one of the contacts, and the green lead 50 is electrically connected to a fourth one of the contacts. Accordingly, the cover plate 24 is provided with indicating indicia 54 which clearly labels the appropriate contact 32 as being connected to either the red lead 44, the blue lead 46, the yellow lead 48 or the green lead 50. Although the invention thus far has been described as having a total of four contacts 32, it is within the intent and purview of the present invention to construct the telephone tester junction box 10 having any plurality of contacts which correspond to the number of connections within the modular jack 52, such as six contacts for six wire telephone lines, etc.

Figure 6:
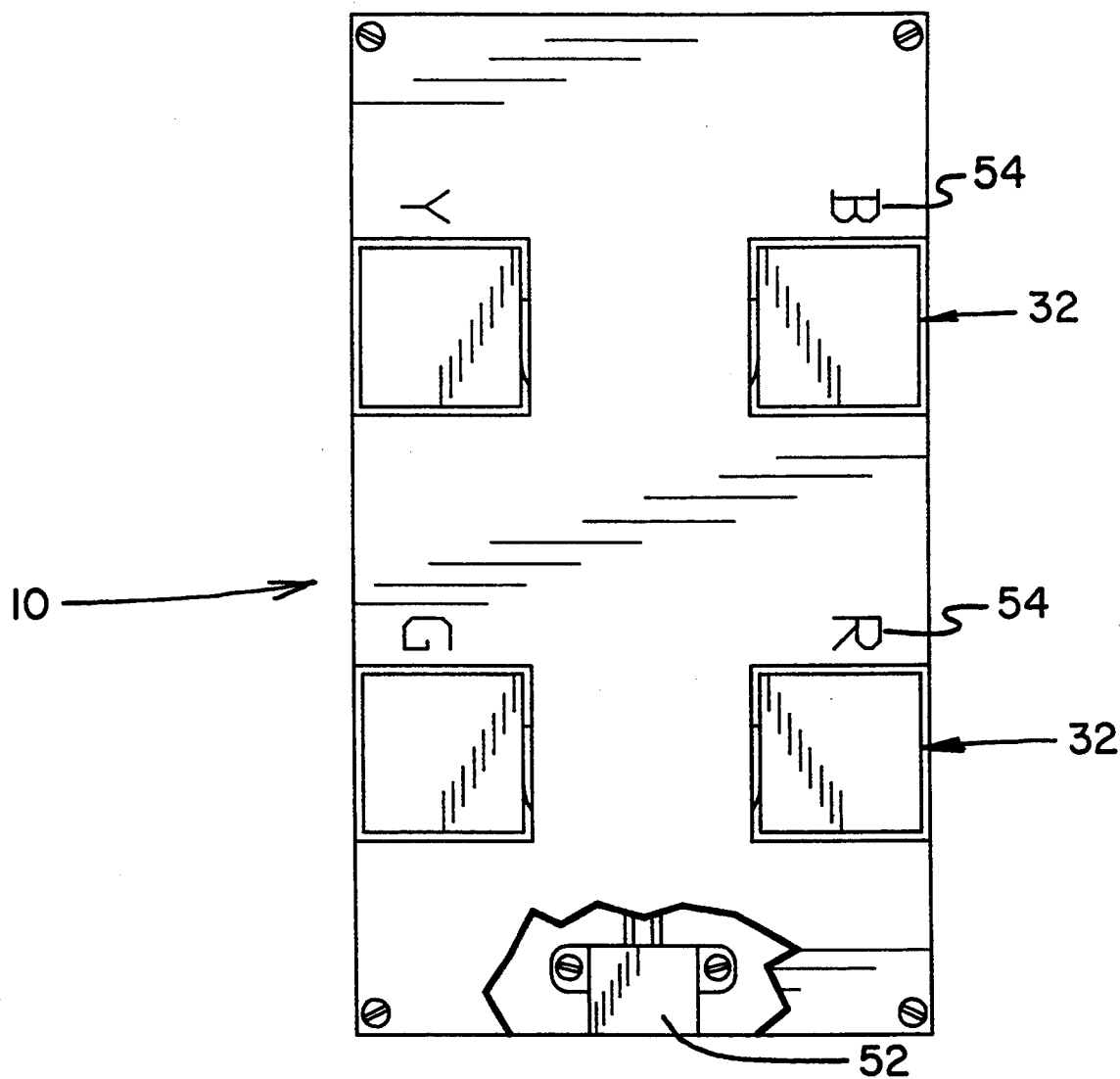
FIG. 6 is a top plan view, partially in cross section, illustrating an internal mounting of a modular jack.
Figure 7:
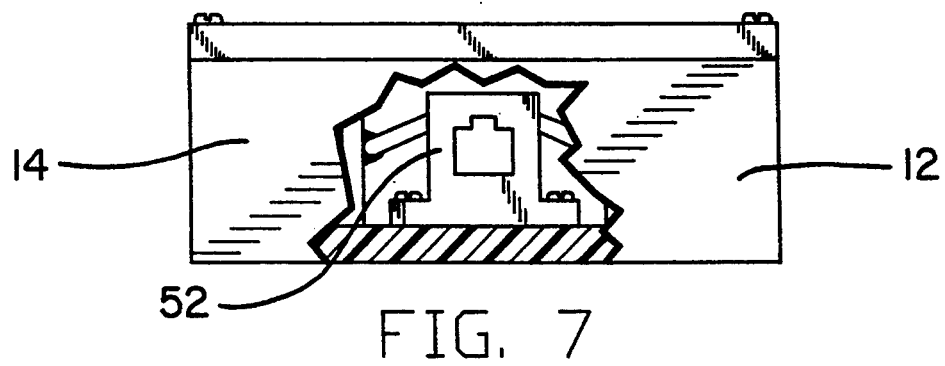
FIG. 7 is a front elevation view, partially in cross section, illustrating the internally mounted modular jack.

While the extension line 42 greatly enhances the portability of the device 10 by allowing for remote placement of the housing 12 relative to the modular jack 52, the modular jack 52 may be alternatively mounted within the housing 12, as illustrated in FIGS. 6 and 7. With this mounting arrangement, the modular jack is secured to the base 22 by threaded fasteners, with the modular jack positioned immediately behind the front wall 14, with the front wall having a front wall aperture which allows for engagement of a modular telephone male connector to the modular jack 52.

In use, the telephone tester junction box 10 is utilized to directly connect an unillustrated telephone testing apparatus to a telephone line 56, such as illustrated in FIG. 1, for example. Specifically, the phone line 56, conventional to most telephone installations, is provided with a male modular connector which engages the telephone 58 to provide electrical communication between the telephone and the phone line 56. Such modular male connector may thusly be disconnected from the telephone 58 and coupled to the modular jack 52 of the present invention 10. Such connection of the phone line 56 to the modular jack 52 as described above will result in electrical communication between the contacts 32 and the phone line 56 in accordance with the polarity labelled by the indicating indicia 54 upon the cover plate 24. Thus, the alligator clips of a telephone tester apparatus, such as a tone generator, tone tracer, or the like, may then be connected to the appropriately labelled contacts 32 in accordance with the desired polarity. By this structure and method, the conventional practices of moving furniture to access telephone outlets such that the outlets may then be disassembled to directly attach the alligator clips thereto is substantially eliminated. Further, the additional conventional practice of disassembling the telephone 58 to thereby connect the alligator clips to portions of the telephone for line testing purposes, is also eliminated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephone tester junction box comprising:

a rectangular housing having a front wall spaced from a rear wall with a pair of spaced side walls extending parallel between said front and rear walls, the housing further including a base integrally formed with said walls and a cover plate removably coupled to said walls at a location above the base, with each of the side walls being provided with two rectangularly shaped, spaced side wall apertures which extend from said upper surface of said side walls to said base, said cover plate having four cover plate apertures orthogonally aligned with respective side wall apertures to thereby create a general quadrature type arrangement;

four contacts secured to said base for engaging alligator clips of a telephone testing apparatus, each of said contacts being aligned with an individual one of said cover plate apertures, each of said contacts comprising a contact base plate secured to said base, a contact vertical plate extending orthogonally from said contact base plate, with an orthogonally projecting contact horizontal plate extending from said contact vertical plate and positioned slightly below said respective cover plate apertures;

an extension line disposed within and projected from the housing and having four contrasting colored leads, each of said leads being electrically coupled to an individual one of said contacts, said extension line further having a modular female jack electrically coupled thereto, said modular female jack being operable to engage a modular telephone male connector; and indicating indicia positioned upon said cover plate for labelling each contact relative to said contrastingly colored leads.

* * * * *